United States Patent [19]

Wössner et al.

[11] 4,364,457

[45] Dec. 21, 1982

[54] PISTON-CYLINDER UNIT PARTICULARLY FOR SHOCK ABSORBER OR COMPRESSION STRUT

[75] Inventors: Felix Wössner, Schweinfurt; Günther Handke, Euerbach, both of Fed. Rep. of Germany

[73] Assignee: Fichtel & Sachs A.G., Schweinfurt, Fed. Rep. of Germany

[21] Appl. No.: 96,014

[22] Filed: Nov. 20, 1979

[30] Foreign Application Priority Data

Nov. 24, 1978 [DE] Fed. Rep. of Germany ... 7834927[U]

[51] Int. Cl.³ ............................................... F16F 9/36
[52] U.S. Cl. ................................ 188/322.17; 267/8 R
[58] Field of Search ................... 188/321, 322, 322.16, 188/322.17, 322.19; 267/8 R, 35, 120, 121, 140

[56] References Cited

U.S. PATENT DOCUMENTS

| | | | |
|---|---|---|---|
| 3,096,897 | 7/1963 | Hansen | 220/306 |
| 3,661,236 | 5/1972 | Wossner | 188/322 |
| 3,830,347 | 8/1974 | Fader et al. | 188/322 |
| 4,235,426 | 11/1980 | Sullivan et al. | 267/35 |

FOREIGN PATENT DOCUMENTS

| | | | |
|---|---|---|---|
| 2521349 | 11/1975 | Fed. Rep. of Germany | 188/322 |
| 2294869 | 7/1976 | France | 188/321 |
| 906550 | 9/1962 | United Kingdom | |
| 1085157 | 9/1967 | United Kingdom | |
| 1133079 | 11/1968 | United Kingdom | 188/322 |
| 1281889 | 7/1972 | United Kingdom | |
| 2000251 | 1/1979 | United Kingdom | |
| 2015693 | 9/1979 | United Kingdom | |

Primary Examiner—E. R. Kazenske
Attorney, Agent, or Firm—Toren, McGeady & Stanger

[57] ABSTRACT

A piston-cylinder unit including a cylinder assembly, a guide and seal assembly at one end of the cylinder assembly and a piston rod assembly axially movable relative to said cylinder assembly through the guide and seal assembly is formed with a cap assembly having an annular bottom, which is essentially normal to the axis of the unit, and a jacket with the piston rod assembly extending through the annular bottom and with the annular bottom being located adjacent the guide and seal assembly on a side thereof facing away from a hollow space defined within the cylinder assembly. The jacket bears against the outer circumferential surface of the cylinder assembly, and a tubular body which is elastically compressible in the axial direction is arranged on the outer portion of the piston rod assembly, with the tubular body being fastened in the axial direction on a fastening point of the piston rod assembly at a portion facing away from the cap assembly. The tubular body defines around a piston rod of the piston rod assembly an annular chamber which is open toward the cap assembly. A closing device on the cap assembly closes the annular chamber when the piston rod approaches its inner end position, and passages on the cap assembly connect the annular chamber with the atmosphere when that end of the tubular body facing toward the cap assembly has contact with the closing device. The invention is particularly structured with the closing device formed by an end face of the annular bottom which faces away from the guide and seal assembly and with the passages integrated in the cap.

11 Claims, 8 Drawing Figures

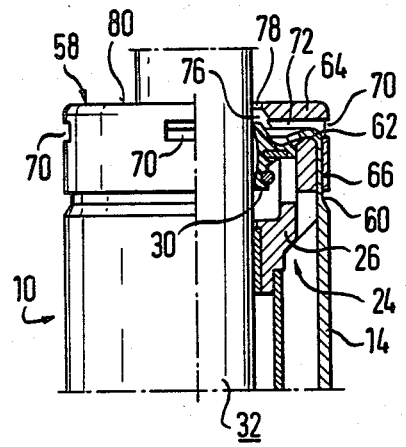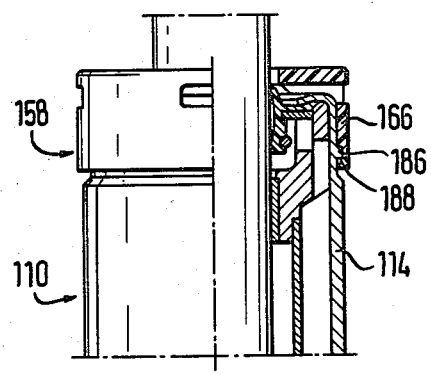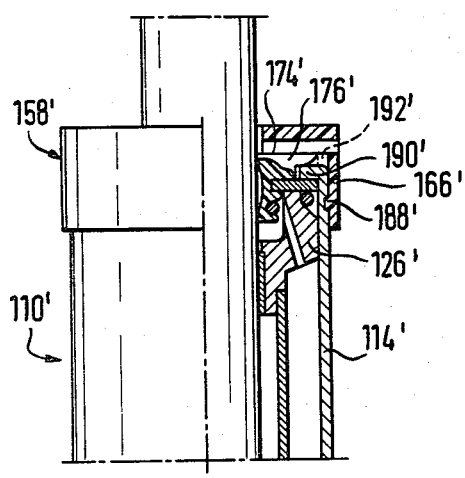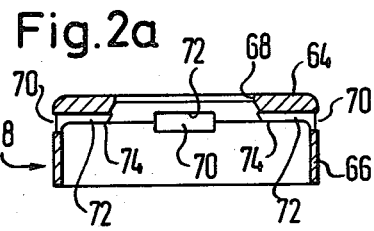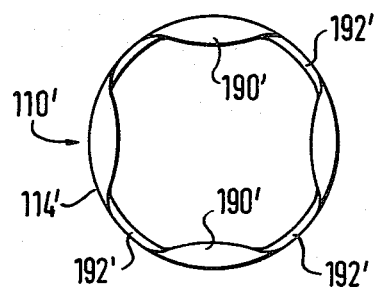

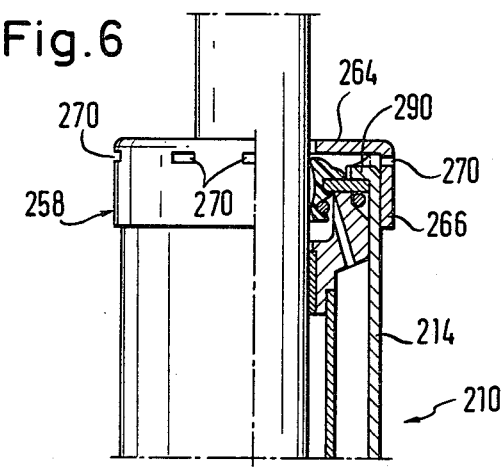
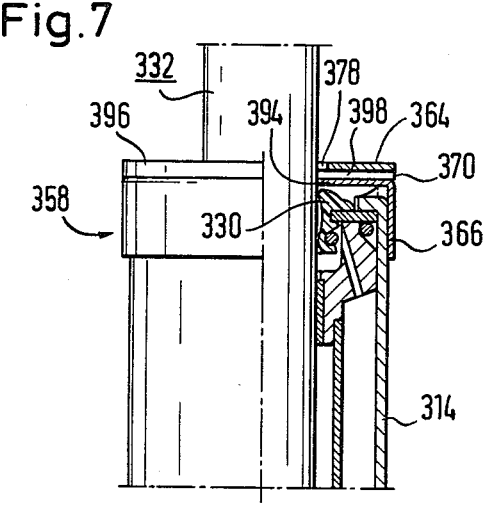

PISTON-CYLINDER UNIT PARTICULARLY FOR SHOCK ABSORBER OR COMPRESSION STRUT

BACKGROUND OF THE INVENTION

The present invention relates generally to piston and cylinder assemblies particularly of the type suited for use as shock absorbers or compression struts.

In piston-cylinder units of this type, an elastically compressible tubular body serves as an axially compressible limit stop which becomes effective when the piston rod of the unit is essentially retracted into the cylinder assembly and prevents a hard impact of the piston rod assembly in the cylinder unit. During axial compression of the resilient tubular body, an annular chamber defined within the tubular body is reduced in size so that excess pressure of the enclosed air can be generated within this annular chamber which is closed by means of closing means on a cap assembly on the cylinder assembly.

It is desirable to allow this excess pressure to excape as much as possible in the region of the cap assembly because this is the most suitable location for providing appropriate passage means. On the other hand, it is desirable to prevent the excess pressure from having a negative effect on the sealing function of the seal of the guide and seal assembly.

In view of this, it is known to arrange on the outside of an annular bottom of the cap an embossed plate which is not integrated in the cap, the plate providing the passage means for bleeding the annular chamber. Radial bleeder ducts are formed in this plate by means of embossing.

This plate has been constructed with a relatively large diameter exceeding the diameter of the cap, so that the space to be provided for the piston-cylinder units, particularly when supported through this plate, is increased. In addition, the manufacture of the plate by means of embossing and subsequent mounting on the cap is cumbersome and expensive.

The present invention is directed toward the further development of a piston-cylinder unit of the aforementioned type wherein as little structure as possible is required for the closing means and for the bleeding function and wherein the diameter of the entire unit is not increased.

SUMMARY OF THE INVENTION

In accordance with the present invention the closing means for closing the annular chamber defined by the resilient tubular body are formed by an end face of the annular bottom facing away from the guide and seal assembly and the passage means connecting the annular chamber with the atmosphere are integrated in the cap.

The structure according to the invention not only makes it possible to protect the guide and seal assembly from excess pressures within the annular chamber, but, furthermore, it makes it possible to pneumatically remove dirt and dust which settles on the seal in the region of the guide and seal assembly. This is a significant advantage of the invention which is obtained when a bleeding chamber is defined within the cap between the annular bottom and the guide and seal assembly which bleeding chamber can be connected to the annular chamber through a first opening means in the annular bottom and is connected to the atmosphere through second opening means in the cap, and when the guide and seal assembly is provided with a seal which borders on the bleeding chamber.

The piston rod-cylinder unit can be used especially in shock absorbers or compression struts as they are used in motor vehicles, for example, in so-called double-tube shock absorbers.

In accordance with the invention, the cap can be constructed as an extruded or pressed member, for example, of rubber or of plastic material. This design of the cap makes it possible to mount the cap without the use of threaded connections which gives rise to a further reduction in the costs for manufacture and assembly.

The annular body may be made of any elastomeric material, particularly rubber.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE DRAWINGS

In the drawings:

FIG. 2 is a partial sectional view showing a modification of the piston-cylinder unit according to the invention;

FIG. 2a is a sectional view taken through the cap of the embodiment according to FIG. 2;

FIG. 3 is a partial sectional view showing a second modification of the piston-cylinder unit according to the invention;

FIG. 4 is a partial sectional view showing a third modification of the invention;

FIG. 5 is a rear view of the outer tube of the piston-cylinder unit according to FIG. 5;

FIG. 6 is a partial sectional view showing a fourth modification of the piston-cylinder unit according to the invention; and FIG. 7 is a partial sectional view showing a fifth modification of the piston-cylinder unit according to the invention.

DETAILED DESCRIPTION OF THE PREFERRED EMBODIMENTS

Figure 1:
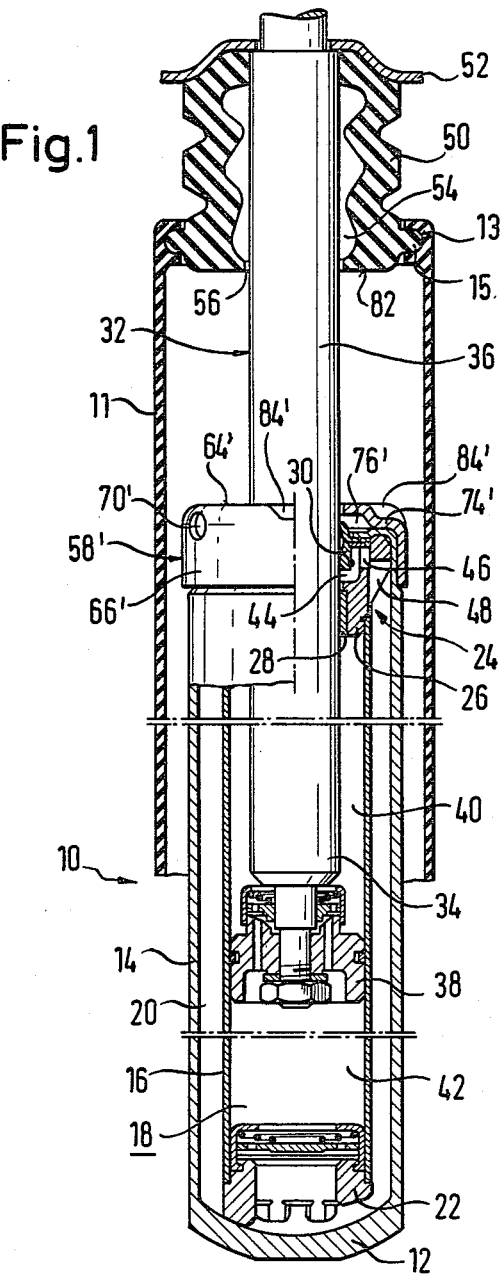
FIG. 1 is a longitudinal sectional view taken through a piston-cylinder unit constructed in accordance with the invention.

Referring to the drawings, it will be seen that the basic principles of the invention are particularly embodied in the structure shown in FIG. 1 and that the modifications according to FIGS. 2 through 7 merely exemplify structural details but follow the same basic principle as the embodiment according to FIG. 1.

In FIG. 1, there is shown a cylinder assembly 10 which comprises an inner tube 16 and an outer tube 14 which is closed by a bottom 12. A central hollow space 18 is formed within the inner tube 16, and an annular hollow space 20 is formed between the inner tube 16 and the outer tube 14. At its lower end, the inner tube 16 is supported through a damping valve assembly 22 on the bottom 12 of the outer tube 14. The upper end of the inner tube 16 is centered within the outer tube 14 by means of a guide and seal assembly 24. The guide and seal assembly comprises an annular base 26 and a guide sleeve 28 arranged on the base 26 with an annular seal 30 being arranged outside of the guide sleeve 28.

A piston rod 32 is inserted into the central hollow space 18 through the guide and seal assembly 24. The piston rod 32 comprises an inner portion 34 and an outer portion 36. On the inner portion 34 there is arranged a damping piston assembly 38 which is provided with throttled passages in order to connect the sections 40 and 42 formed by the piston assembly 38 within the central hollow space 18. The central hollow space 18 is filled with liquid, for example, a hydraulic oil, and the annular hollow space 20 is also filled with liquid in its lower portion and with air in its upper portion.

Between the guide sleeve 28 and the annular seal 30 there is formed an annular chamber 44 which collects any liquid which may leak through the guide sleeve 28 and which allows this liquid to flow back into the annular hollow space 20 through breakthroughs 46 and 48 of the base body.

On the outer portion 36 of the piston rod 32 there is mounted a resilient tubular body 50 of rubber which is fastened in sealed engagement on the outer end of the piston rod 32 by means of a fastening cup or washer 52. Between the tubular body 50 and the outer portion 36 of the piston rod 32 there is formed an annular chamber 54 which is open toward the bottom through an annular gap 56.

As can best be seen from FIG. 2, the cylinder assembly 10 is provided with a cap 58 at its upper end. FIG. 2 also shows that the upper end of the outer tube 14 is reduced in wall thickness toward the top starting at 60. The uppermost edge 62 of the outer tube 14 is bent radially inwardly and thereby fixes the base body 26 of the guide and seal assembly in the axial direction.

The cap 58 comprises an annular bottom 64 and a jacket 66. The jacket 66 is pressed onto the upper end of the outer tube 14 in the region of the reduced wall thickness of the outer tube, so that the outer circumference of the cap jacket 66 is essentially in alignment with the outer circumference of the section of the outer tube 14 having the full wall thickness. The design of the cap 58 is illustrated in more detail in FIG. 2a.

The annular bottom 64 has a central passage 68. The jacket 66 of the cap has radially directed openings 70. The radially directed openings 70 continue in radial grooves 72 on the inner side of the annular bottom 64, with the radial grooves 72 extending into the central passage 68. Between the radial grooves 72 there are formed axial projections 74 which, according to FIG. 2, rest on the bent edge 62 of the outer tube 14. Within the cap 58 there is formed a bleeder chamber 76 which is open toward the top through an annular gap 78 and radially outwardly through radial grooves 72 and the radially directed openings 70. The seal 30 is arranged immediately adjacent this bleeder space 76. The annular bottom 64 of the cap 58 has an upper stop surface 80 which makes contact with the lower end face 82 of the tubular body 50 (see FIG. 1) when the piston rod 32 approaches its innermost position within the central hollow space 18.

When the tubular body 50 makes contact with the stop surface 80 through its lower end face 82, the annular space 54 is reduced in size and the air enclosed in the annular space 54 can expand through the annular gap 78, the bleeder space 76, the radial grooves 72 and the radially directed openings 70. This results in air flow within the bleeder chamber 76 and this air flows past the upper edge of the seal 30 in such a manner that dust and dirt particles collected on this upper edge of the seal 30 are blown away and escape into the atmosphere.

The cap 58 illustrated in FIG. 2a may be constructed as a single integral extruded member or as a pressed member.

The cap 58' illustrated in FIG. 1 is only slightly different in its design from the embodiment according to FIGS. 2 and 2a. In FIG. 1, the cap has embossed sections 84' in the transition region from the annular bottom of the jacket, thereby forming axial projections 74'. As in the embodiment according to FIGS. 2 and 2a, the axial projections 74' are located on the bent upper edge of the outer tube 14 so that, in this case also, a bleeder chamber 76' is defined. Between the embossed sections 84', radially directed openings 70' are formed in the cap jacket 66'. The manner of operation is the same as that described in connection with FIGS. 2 and 2a.

The embodiment according to FIG. 3 differs from that according to FIG. 2 only in that a radially outwardly projecting annular rib 186 is arranged on the outer circumferential surface of the outer tube 14, the annular rib 186 engaging an annular recess 188 in the inner circumferential surface of the cap jacket so that the cap is seated on the outer tube through a type of snap closure, the cap being made of an elastomeric material, such as rubber.

In the embodiment according to FIG. 4, the cap 158' differs from the cap 158 of FIG. 3 only in that a radially inwardly projecting annular rib 188' is provided on the inner circumferential surface of the cap jacket 166, the annular rib engaging an annular groove of the outer circumferential surface of the outer tube 114'.

A further modification is shown in FIG. 5 where the upper end of the outer tube 114' is bent radially inwardly only in partial regions 190' of its circumference in order to affix the guide and seal assembly 126' in the axial direction. Accordingly, between the bent partial regions 190', axial projections 192' are formed which bear against the axial projections 174' of the cap 158' so that an enlarged bleeder space 176' is formed. With respect to their design and manner of operation, the embodiments according to FIGS. 4 and 5 otherwise correspond to the embodiment according to FIGS. 2 and 2a.

In the embodiment according to FIG. 6, the axial projections on the inner side of the annular bottom 264 are omitted and the radial openings 270 merely extend through the cap jacket 266 without intersecting the outside of the annular bottom 264. In this embodiment, the outer tube 214 is constructed at its upper end in the same manner as illustrated in FIG. 5; i.e., with bent circumferential regions 290. Therefore, in the region of these bent circumferential regions 290 of the outer tube 214, radial ducts are formed which are in alignment with the radial openings 270 of the cap jacket 266. In this case, the distribution of the radial openings over the circumference of the cap jacket 266 is such that in each angular position of the cap jacket 266 relative to the outer tube 214 one of the bent circumferential regions 290 is in alignment with one of the radially directed openings 270.

In the embodiment according to FIG. 7, the upper end of the outer tube 314 is constructed in the same manner as in FIG. 5. However, the cap 358 is constructed differently. In this case, the annular bottom 364 consists of two discs 394 and 396 which are arranged next to each other in a sandwich-like manner. The disc 394 is constructed as a single piece with the cap jacket 366 and the annular disc 396 being glued onto the annular disk 364. On its surface facing toward the annular disc 394, radial ducts 398 are formed in the annular disc 396 which lead outwardly into radially directed openings 370. The radial ducts formed by the radial grooves 398 are in communication with an annular gap 378 which is formed between the inner circumference of the annular disc 396 and the outer circumference of the piston rod 332. In this case, the bleeding path extends through the annular gap 378 and the radial grooves 398. Blowing out of particles from the seal 330 is less effective in this embodiment.

In the preferred embodiments, the cap may consist of plastic material if utilization of rubber is not more advantageous in view of the snap closure.

If a snap closure is not provided, the cap may be pressed onto the upper end of the outer tube.

The cap jacket may be constructed in all embodiments with a rather small wall thickness, so that the cap proper projects only slightly beyond the outer circumference of the outer tube 14 when the outer tube has the full wall thickness at its end.

Even more advantageous is an embodiment as illustrated in FIG. 2, wherein the outer tube 14 has at its upper end a reduced wall thickness so that the outer circumference of the cap jacket is in alignment with the outer circumference of the outer tube in the region of its full wall thickness.

In the embodiment according to FIG. 7, the radial grooves 398 can of course also be recessed in the annular disc 394.

As can be seen in FIG. 1, a piston protection tube 11 is fastened on the tubular body 50 in such a manner that an inner annular groove 13 of the protection tube 11 receives a radial projection 15 of the tubular body 50. The piston protection tube 11 may also be constructed as a pressed or extruded member, for example, of plastic material.

While specific embodiments of the invention have been shown and described in detail to illustrate the application of the inventive principles, it will be understood that the invention may be embodied otherwise without departing from such principles.

What is claimed is:

1. A piston-cylinder unit, particularly adapted for use as a shock absorber or compression strut comprising:
    a cylinder assembly having an axis, two axial ends and an outer circumferential surface;
    at least one hollow space defined within said cylinder assembly;
    a guide and seal assembly on one end of said cylinder assembly;
    a piston assembly which is axially moveable between an inner and an outer end position relative to said cylinder assembly, said piston assembly including a piston rod having an inner portion projecting into said hollow space through said guide and seal assembly and an outer portion arranged outside of said cylinder assembly;
    a cap assembly including a cap comprising an annular bottom which is essentially normal to said axis and a jacket, with said piston rod extending through said annular bottom and with said annular bottom being located adjacent that side of said guide and seal assembly which is remote from said hollow space, said jacket bearing against said outer circumferential surface of said cylinder assembly;
    a tubular body arranged on said outer portion of said piston rod, said tubular body being elastically compressible in the axial direction and being fastened in the axial direction on a fastening point of said piston rod with a part which faces away from said cap assembly, said tubular body together with said piston rod defining in the axial section between said fastening point and its end facing toward said guide and seal assembly an annular chamber which is open toward said cap assembly;
    closing means on said cap assembly for closing the annular chamber when said piston rod approaches said inner end position; and
    passage means on said cap assembly connecting said annular chamber to the atmosphere when an end of said tubular body facing toward said cap assembly bears against said closing means;
    said cylinder assembly including a tube forming the outer circumferential surface of said cylinder assembly and bent radially inwardly at its end facing toward said cap assembly in partial regions of its circumference, with axial projections of said cylinder being formed on said tube between said bent circumferential regions, said axial projections supporting said annular bottom of said cap assembly in the axial direction, said guide and seal assembly comprising a sealing member, said sealing member being axially coextensive with at least part of the axial length of said axial projections.

2. A unit according to claim 1 wherein said closing means are formed by an end face of said annular bottom facing away from said guide and seal assembly.

3. A unit according to claim 1, wherein within said cap between said annular bottom and said guide and seal assembly there is defined a flow chamber which can be connected to said annular chamber through first opening means in said annular bottom, said flow chamber being connected to the atmosphere through second opening means in said cap.

4. A unit according to claim 3 wherein said first opening means are formed in said annular bottom by means of a gap which is defined between said piston rod and the inner circumference of said annular bottom.

5. A unit according to claim 3 wherein said second opening means extend through said jacket of said cap in a radial direction.

6. A unit according to claim 3 wherein said second opening means of said cap jacket extend in a radial direction and at least partially overlap with said bent circumferential regions of said tube end.

7. A unit according to claim 6 wherein the number and circumferential dimensions of said bent partial regions of said tube end and of said radial openings of said cap jacket are adjusted to each other in such a manner that in any angular position of said cap relative to said cylinder assembly at least one radial opening in said jacket overlaps at least partially with a bent circumferential region of said tube end.

8. A unit according to claim 1 wherein said sealing member is exposed to said flow chamber both in the axial and in the radial direction thereof.

9. A unit according to claim 1 wherein said annular bottom is composed of two annular discs in a sandwich-like arrangement, and wherein in a bearing surface of at least one of said annular discs there are formed radially directed grooves which lead to the atmosphere with their radially outer ends and can be connected to said annular chamber with their radially inner ends.

10. A unit according to claim 9 wherein one of said annular discs faces away from said guide and seal assembly, and wherein at least said one disc defines in its radially inner circumference an annular gap with said piston rod.

11. A unit according to claim 10 wherein the outer circumference of said one annular disc facing away from said guide and seal assembly has an outer diameter which at least approximates the outer diameter said cap jacket.

* * * * *